(12) United States Patent
Chhabra et al.

(10) Patent No.: US 11,184,396 B2
(45) Date of Patent: Nov. 23, 2021

(54) TECHNIQUES TO ENFORCE POLICIES FOR COMPUTING PLATFORM RESOURCES

(71) Applicant: INTEL CORPORATION, Santa Clara, CA (US)

(72) Inventors: Siddhartha Chhabra, Portland, OR (US); Prashant Dewan, Portland, OR (US)

(73) Assignee: INTEL CORPORATION, Santa Clara, CA (US)

(*) Notice: Subject to any disclaimer, the term of this patent is extended or adjusted under 35 U.S.C. 154(b) by 520 days.

(21) Appl. No.: 16/143,639

(22) Filed: Sep. 27, 2018

(65) Prior Publication Data

US 2019/0044977 A1   Feb. 7, 2019

(51) Int. Cl.
| | |
|---|---|
| *H04L 29/06* | (2006.01) |
| *H04L 9/32* | (2006.01) |
| *G06F 9/30* | (2018.01) |
| *G06F 21/57* | (2013.01) |
| *G06F 21/62* | (2013.01) |
| *G06F 21/74* | (2013.01) |

(52) U.S. Cl.
CPC .......... *H04L 63/20* (2013.01); *G06F 9/30101* (2013.01); *G06F 21/57* (2013.01); *G06F 21/62* (2013.01); *G06F 21/74* (2013.01); *H04L 9/3242* (2013.01); *H04L 63/105* (2013.01); *H04L 63/1458* (2013.01); *H04L 2209/12* (2013.01)

(58) Field of Classification Search
CPC .......... G06F 21/57; G06F 21/74; G06F 21/62; G06F 9/30101; H04L 9/3242; H04L 63/20; H04L 63/105; H04L 2209/12; H04L 63/1458
USPC ............................................................. 726/1
See application file for complete search history.

(56) References Cited

U.S. PATENT DOCUMENTS

| | | | |
|---|---|---|---|
| 2015/0271207 A1* | 9/2015 | Jaiswal | H04L 63/20 726/1 |
| 2015/0310210 A1* | 10/2015 | Sia | H04W 4/60 726/1 |
| 2016/0277373 A1* | 9/2016 | Murray | H04L 9/0891 |

(Continued)

*Primary Examiner* — Benjamin A Kaplan
(74) *Attorney, Agent, or Firm* — Kacvinsky Daisak Bluni PLLC

(57) ABSTRACT

Various embodiments are generally directed to techniques to enforce policies for computing platform resources, such as to prevent denial of service (DoS) attacks on the computing platform resources. Some embodiments are particularly directed to ISA instructions that allow trusted software/applications to securely enforce policies on a platform resource/device while allowing untrusted software to control allocation of the platform resource. In many embodiments, the ISA instructions may enable secure communication between a trusted application and a platform resource. In several embodiments, a first ISA instruction implemented by microcode may enable a trusted application to wrap policy information for secure transmission through an untrusted stack. In several such embodiments, a second ISA instruction implemented by microcode may enable untrusted software to verify the validity of the wrapped blobs and program registers associated with the platform resource with policy information provided via the wrapped blobs.

25 Claims, 12 Drawing Sheets

(56) References Cited

U.S. PATENT DOCUMENTS

2016/0283198 A1* 9/2016 Walker .............. G06F 9/44505
2019/0215301 A1* 7/2019 Abdulhayoglu ...... H04L 63/164

* cited by examiner

Instruction set architecture (ISA) instruction 220

Target
222

Command
224

Policy
226

Target data
228

Owner identifier
230

Counter
232

Message authentication code (MAC)
234

Generate a wrapped lock policy and a wrapped unlock policy with a first instruction set architecture (ISA) instruction implemented by microcode based on policy data provided by trusted software, wherein the wrapped lock policy includes a policy setting for a platform resource based on the policy data
602

Communicate the wrapped lock policy and the wrapped unlock policy to untrusted system software
604

Verify the wrapped lock policy and the wrapped unlock policy with a second ISA instruction implemented by microcode
606

Determine generation of the wrapped lock policy and the wrapped unlock policy are associated with a common owner identifier
608

Store the policy setting in a policy register to program the platform resource for use by the trusted software with the second ISA instruction based on verification of the wrapped lock policy and the wrapped lock policy and determination the wrapped lock policy and the wrapped lock policy are associated with the common owner identifier
610

FIG. 7

Storage Medium 700

Computer Executable
Instructions for 500

Computer Executable
Instructions for 600

TECHNIQUES TO ENFORCE POLICIES FOR COMPUTING PLATFORM RESOURCES

BACKGROUND

Generally, a computing platform refers to an environment in which software is executed. Computing platforms may include various resources that are used to achieve objectives of software executing on a computing platform. For example, platform resources may include accelerators or input/output devices, such as a graphics processing unit (GPU), an application-specific integrated circuit (ASIC), or a display. Typically, these platform resources may be temporarily allocated for use by different software applications executing on the computing platform, such as by an operating system (OS) of the computing platform. Oftentimes an application may seek to apply specific policies to a platform resource while the platform resource is utilized by the application. For example, an application for secure transaction processing may seek to apply a policy that prevents a confirmation box from being occluded on a display, such as by a malicious application.

BRIEF DESCRIPTION OF THE DRAWINGS

FIG. 2 illustrates exemplary aspects of an instruction set architecture (ISA) instruction according to one or more embodiments described herein.

FIG. 6 illustrates an embodiment of a second logic flow according to one or more embodiments described herein.

FIG. 7 illustrates an embodiment of a storage medium according to one or more embodiments described herein.

DETAILED DESCRIPTION

Figure 1:
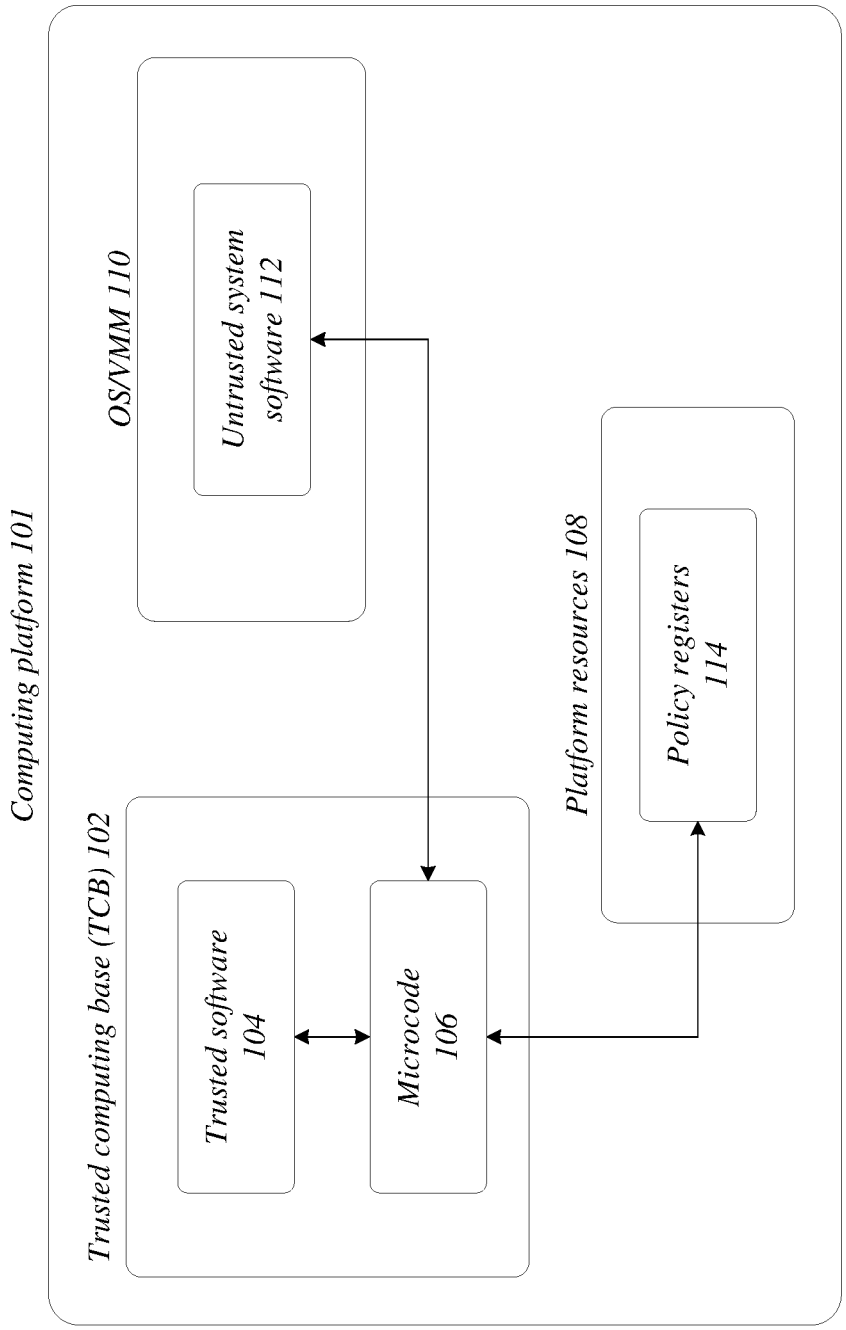
FIG. 1 illustrates exemplary aspects of a computing platform according to one or more embodiments described herein.

Various embodiments are generally directed to techniques to enforce policies for computing platform resources, such as to prevent denial of service (DoS) attacks on the computing platform resources. Some embodiments are particularly directed to ISA instructions that allow trusted software/applications to securely enforce policies on a platform resource/device while allowing untrusted software to control allocation of the platform resource. In many embodiments, the ISA instructions may enable secure communication between a trusted application and a platform resource. In several embodiments, a first ISA instruction implemented by microcode, referred to as a WRAP_POLICY instruction, may enable a trusted application to wrap policy information for secure transmission through an untrusted stack. In several such embodiments, a second ISA instruction implemented by microcode, referred to as an UNWRAP_POLICY instruction, may enable untrusted software to verify the validity of the wrapped blobs and program registers associated with the platform resource with policy information provided via the wrapped blobs. In various embodiments, lock bits may be utilized by the ISA instructions to prevent unauthorized modification of the registers associated with the platform resource. These and other embodiments are described and claimed.

Some challenges facing the application of policies to platform resources include an inability to enforce the policies on the platform resources. Such challenges may result from allocation of the platform resources being controlled by untrusted software to enable multiplexing of the platform resources between various user-level applications. For example, a trusted computing base (TCB) with ring-3 software may exclude ring-0 software, such as an operating system (OS) or a virtual machine monitor (VMM), that controls allocation of platform resources, leading to a direct conflict with security requirements for device policy enforcement by applications within the TCB as policy enforcement needs to be done in a manner that the ring-0 software cannot manipulate the policy.

Adding further complexity, an application may request policy enforcement using the regular OS stack. For instance, a driver associated with a platform resource may be used to implement the policy desired by the application. However, the policies may be implemented via registers that are available as memory mapped input/output (MMIO) accessible registers and hence may be freely modified. Additionally, a request by an application to apply a policy may be ignored. In such instances, this may allow undesired modification of the policy, a failure to implement the policy, and/or unintended reallocation of a resource. Further, once the application no longer needs the policy to be enforced, an indication may be provided to the OS which does the cleanup and any other management functions needed, providing unnecessary attack vectors. These and other factors may result in unsecure systems with limited functionality. Such limitations can prevent secure policy enforcement, contributing to unreliable systems with limited security capabilities.

Various embodiments described herein include secure provisioning of a policy to a platform resource, enforcement of the policy on the platform resources, DoS prevention from ring-3, and policy configuration verification by trusted software. In many embodiments, ISA instructions may be used to lock policy configurations in hardware such that only microcode can unlock it. In several embodiments, the ISA instructions may allow trusted software/applications to securely enforce policies on a platform resource while allowing untrusted software to control allocation of the platform resource. In some embodiments, the ISA instructions may enable secure communication between a trusted application and a platform resource.

In one or more embodiments, a WRAP_POLICY instruction may enable a trusted application to wrap policy information for secure transmission through an untrusted stack. In one or more such embodiments, various commands may be used in conjunction with the WRAP_POLICY instruction to enable a trusted application to implement a secure policy, monitor implementation of the secure policy, and/or conclude implementation of a secure policy. In some embodiments, an UNWRAP_POLICY instruction, may enable untrusted software to verify the validity of the wrapped blobs and program registers associated with the platform resource with policy information provided via the wrapped blobs. In various embodiments, lock bits in conjunction with ownership data and/or timers may be utilized to prevent unauthorized modification of the registers associated with the platform resource. In these and other ways various embodiments described herein may enable secure communication between trusted applications and platform resources as well as reliable enforcement of policies on the platform resources by the trusted applications, resulting in several technical effects and advantages including increased capabilities and improved applicability.

In one embodiment, for example, an apparatus may include a processor and a memory comprising instructions that when executed by the processor cause the processor to perform one or more of the following. In some embodiments, the processor may be caused to generate a wrapped lock policy and a wrapped unlock policy with a first instruction set architecture (ISA) instruction implemented by microcode based on policy data provided by trusted software. In some such embodiments, the wrapped lock policy may include a policy setting for a platform resource based on the policy data. In many embodiments, the processor may be caused to communicate the wrapped lock policy and the wrapped unlock policy to untrusted system software. In several embodiments, the processor may be caused to confirm receipt of the wrapped lock policy and the wrapped unlock policy by the untrusted system software. In various embodiments, the processor may be caused to verify the wrapped lock policy and the wrapped unlock policy with a second ISA instruction implemented by microcode. In one or more embodiments, the processor may be caused to determine generation of the wrapped lock policy and the wrapped unlock policy are associated with a common owner identifier. In some embodiments, the processor may be caused to store the policy setting in a policy register to program the platform resource for use by the trusted software with the second ISA instruction. In some such embodiments, the processor may be caused to store the policy setting in a policy register to program the platform resource for use by the trusted software with the second ISA instruction based on confirmation of receipt of the wrapped lock policy and the wrapped unlock policy, verification of the wrapped lock policy and the wrapped unlock policy, and determination the wrapped lock policy and the wrapped unlock policy are associated with the common owner identifier.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form to facilitate a description thereof. The intention is to cover all modification, equivalents, and alternatives within the scope of the claims.

FIG. 1 illustrates exemplary aspects of a computing platform 101 in environment 100 according to one or more embodiments described herein. The computing platform 101 may include a trusted computing base (TCB) 102, an operating system/virtual machine monitor (OS/VMM) 110, and one or more platform resources 108. In the illustrated embodiment, TCB 102 may include trusted software 104 and microcode 106, the one or more platform resources may include one or more policy registers 114, and the OS/VMM 110 may include untrusted system software 112. In one or more embodiments described herein, trusted software 104 may utilize microcode 106 via one or more ISA instructions to store policies for one or more of the platform resources 108 in corresponding policy registers 114. In several embodiments, untrusted system software 112 may control allocation of the platform resources 112, such as via policy registers 114. However, in several such embodiments, trusted software 104 may be able to enforce a policy for a platform resource by utilizing microcode 106 via ISA instructions to protect the corresponding policy registers from being manipulated by untrusted system software 112. Embodiments are not limited in this context.

In many embodiments, TCB 102 may include a non-ring-0 trusted execution environment (TEE), such as Intel® software guard extensions (SGX). In many such embodiments, the OS/VMM 110 and the untrusted system software 112 may include ring-0 software. For instance, untrusted system software 112 may include a resource manager. In various embodiments, the components, mechanisms, and/or techniques may be used in conjunction with any TEE which does not have ring-0 management software in their TCB. In some embodiments, trusted software 114 may include ring-3 software, such as an SGX enclave. In one or more embodiments, untrusted system software 112 may control allocation of the platform resources 108 to enable multiplexing between different ring-3 applications. In various embodiments, security guarantees regarding policy enforcement may be provided to trusted software 104 via one or more ISA instructions disclosed herein because the microcode 106 are located in TCB 102. In many embodiments, the hardware of the platform resources 108 may be located in TCB 102. In some embodiments, the ISA instructions may allow for the untrusted system software 112 to be in control of which platform resource is taken over by the ring-3 applications while the components, mechanisms, and/or techniques disclosed herein ensure that a misbehaving application cannot cause a denial of service (DoS).

In some embodiments, the components, mechanisms, and/or techniques described herein can allow one or more of secure provisioning of a policy to a platform resource, enforcement of the policy on a platform resource, DoS prevention, and configuration verification by trusted software. As an example, for an SGX enclave (e.g., trusted software 104) to receive trusted display for secure transactions, it may require secure configuration/policy enforcement without the involvement of system software (e.g., untrusted system software 112) for the display engine (e.g., platform resource). This display policy may include things like enabling high-bandwidth digital content protection (HDCP), enforcing location of the transaction confirmation box to prevent it from being occluded (e.g., moved out of view and/or replaced with a malicious window), etcetera. This policy enforcement needs to be done in a way that the OS/VMM cannot change it once it is enforced. Accordingly, components, mechanisms, and/or techniques described herein, such as the ISA instructions, can be used to allow the SGX enclave to securely communicate with and enforce the display policy on the display engine while allowing the system software to still be in control of the resource allocation.

FIG. 2 illustrates exemplary aspects of an instruction set architecture (ISA) instruction 220 in environment 200 according to one or more embodiments described herein. In some embodiments, ISA instruction 220 may be referred to as a WRAP_POLICY instruction. In several embodiments, the WRAP_POLICY instruction may be an ISA extension. The ISA instruction 220 may include a structure with one or more of the following fields including target 222, command 224, policy 226, target data 228, owner identifier 230, counter 232, and message authentication code (MAC) 234. In one or more embodiments described herein, the ISA instruction 220 may be implemented by microcode and used by trusted software as part of implementing and enforcing a policy on a platform resource. Embodiments are not limited in this context.

While the components, mechanisms, and/or techniques described herein are generally applicable to all platform resources with which secure communication might be needed, trusted transaction display will be used as an exemplary use case. For a trusted transaction display, the trusted software (e.g., enclave) may need to display a confirmation dialog asking a user to confirm a transaction. Such a session may have several requirements including displaying the confirmation dialog on top of other surfaces, preventing movement of the dialog box (enforcing view) to ensure the dialog box cannot be occluded with other malicious bitmaps, and enforcing HDCP. In many embodiments, these requirements may make up the policy for the display engine for secure transaction processing usage. However, each of these configuration parameters may be controlled via registers that are available as MMIO accessible registers and hence may be modified by software. In some embodiments, the software may ignore an enclave request to apply these parameters. Accordingly, a secure mechanism is needed to allow an enclave to specify and enforce a policy.

In various embodiments, ISA extensions including ISA instruction 220 may be used to specify and enforce a policy. The ISA instruction 220, or WRAP_POLICY instruction, may allow trusted software (e.g., an enclave) to wrap policy information for its secure transmission through an untrusted stack, such as stack 340 in FIGS. 3A-3C. In several embodiments, as will be described in more detail below, fields of the WRAP_POLICY instruction may be populated by a combination of trusted software, untrusted software, and microcode. In some embodiments, target 220 may include a target for policy programming (e.g., display engine). In various embodiments, command 224 may include an action requested. In many embodiments, policy 226 may include platform resource specific policy bits. In several embodiments, target data 228 may include data (mapping to registers) that needs to be programmed as part of the policy. In one or more embodiments, owner identifier 230 may include a secret ownership identification. In various embodiments, counter 232 may include a hardware/microcode embedded counter used to enforce anti-replay. In some embodiments, MAC 234 may include a MAC over the structure generated by hardware/microcode.

In the secure transaction display example, untrusted software will populate the target 222 as display engine. In various embodiments, the ISA may expose three commands for any platform resources supported. In various such embodiments, the commands may include one or more of a lock policy command, an unlock policy command, and a get policy command (see e.g., FIGS. 3A-3C). With respect to the lock policy command, the trusted software may provide the policy and policy data and request locking the policy in the desired target (e.g., policy registers). With respect to the unlock policy command, when the trusted software is done using the platform resource it may request an unlock to allow the platform resource to be used by other applications on the computing platform. With respect to the get policy command, the trusted software may execute this command to get the status of policy registers in a secure manner.

In various embodiments, policy 226 field may be a bit vector which is interpreted in a resource specific manner. For the secure transaction display example, the bits in this field may correspond to one or more of enforcing coordinates, enforcing HDCP, enforcing display order (e.g., always on top), etcetera. The trusted software may set the appropriate bits desired for the usage. In various embodiments, target data 228 may carry data associated with the policy. For instance, if the display view/coordinates need to be enforced, the trusted software may provide the coordinates to use as target data 228. The owner identifier 230 may carry an identity of the trusted software requesting the policy programming. In some embodiments, this field may be generated by the instruction flow and cannot be provided by software. In some such embodiments, the instruction or microcode may populate this field back in the structure and it may be used to prevent a malicious software entity from masquerading as the trusted software. Examples of owner identifier 230 may include enclave measurement, enclave control structure (SECS) address, etcetera. In various embodiments, the owner identifier 230 may include any immutable entity uniquely associated with the trusted software that can be obtained independently by the hardware/microcode.

In many embodiments, the counter 232 field may carry a counter used internally by the microcode to enforce an anti-replay mechanism for the wrapped policies, as will be discussed in more detail below. In some embodiments, the MAC 234 may carry a cryptographic MAC generated on top of the fields in the ISA instruction 220 structure. In various embodiments, the WRAP_POLICY instruction may generate the MAC 234 to ensure that untrusted software cannot modify the fields without detection. In several embodiments, the WRAP_POLICY instruction may not do any programming to the desired platform resource, but only preparing and securing the policy to be enforced by generating wrapped blobs. In several such embodiments, a second ISA instruction referred to as the UNWRAP_POLICY instruction may be used for programming the desired platform resource. In some embodiments, the UNWRAP_POLICY instruction may take wrapped blobs generated by the WRAP_POLICY instruction as an input parameter.

Figure 3A:
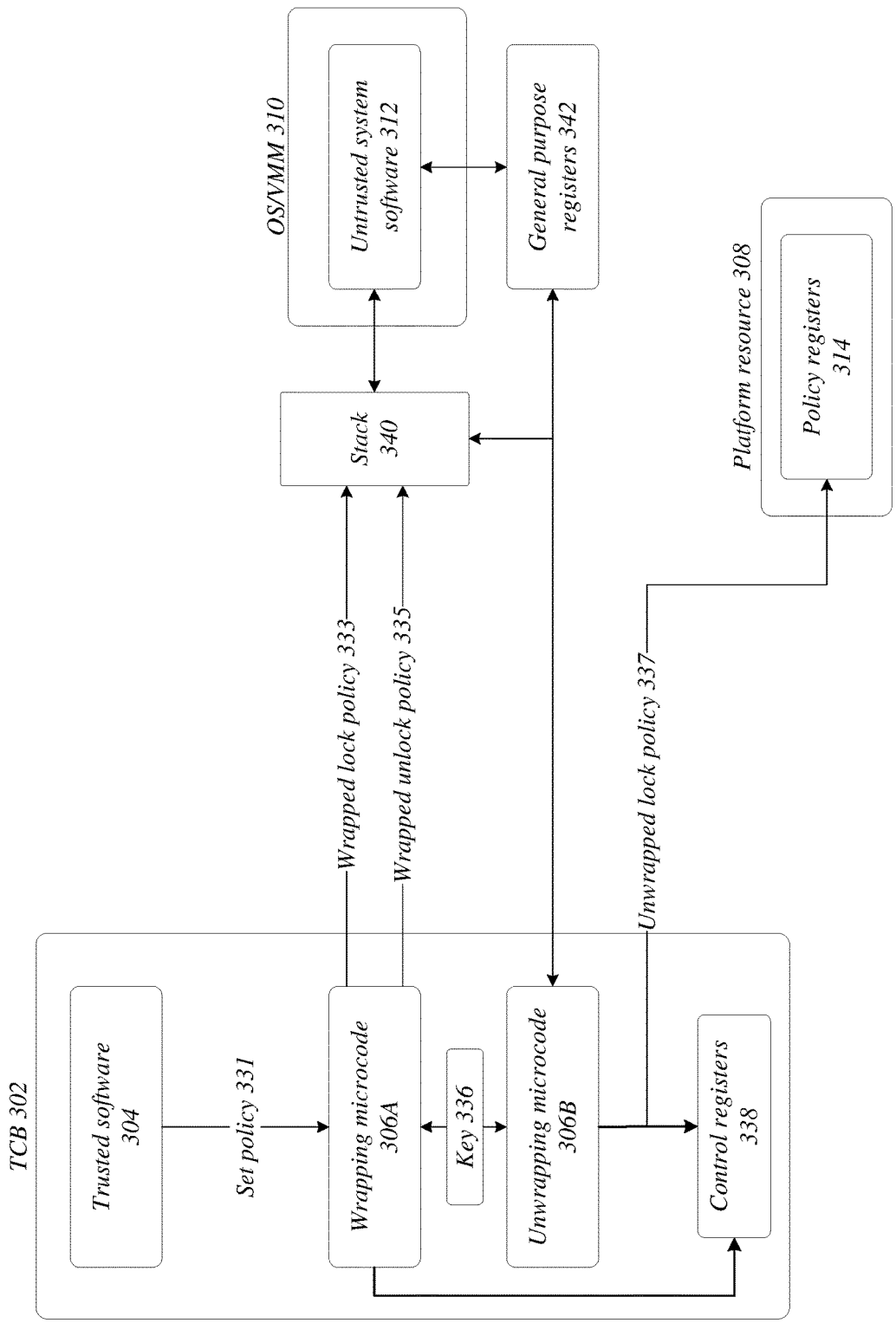
FIGS. 3A-3C illustrate exemplary aspects of controlling a policy for a platform resource according to one or more embodiments described herein.
Figure 3B:
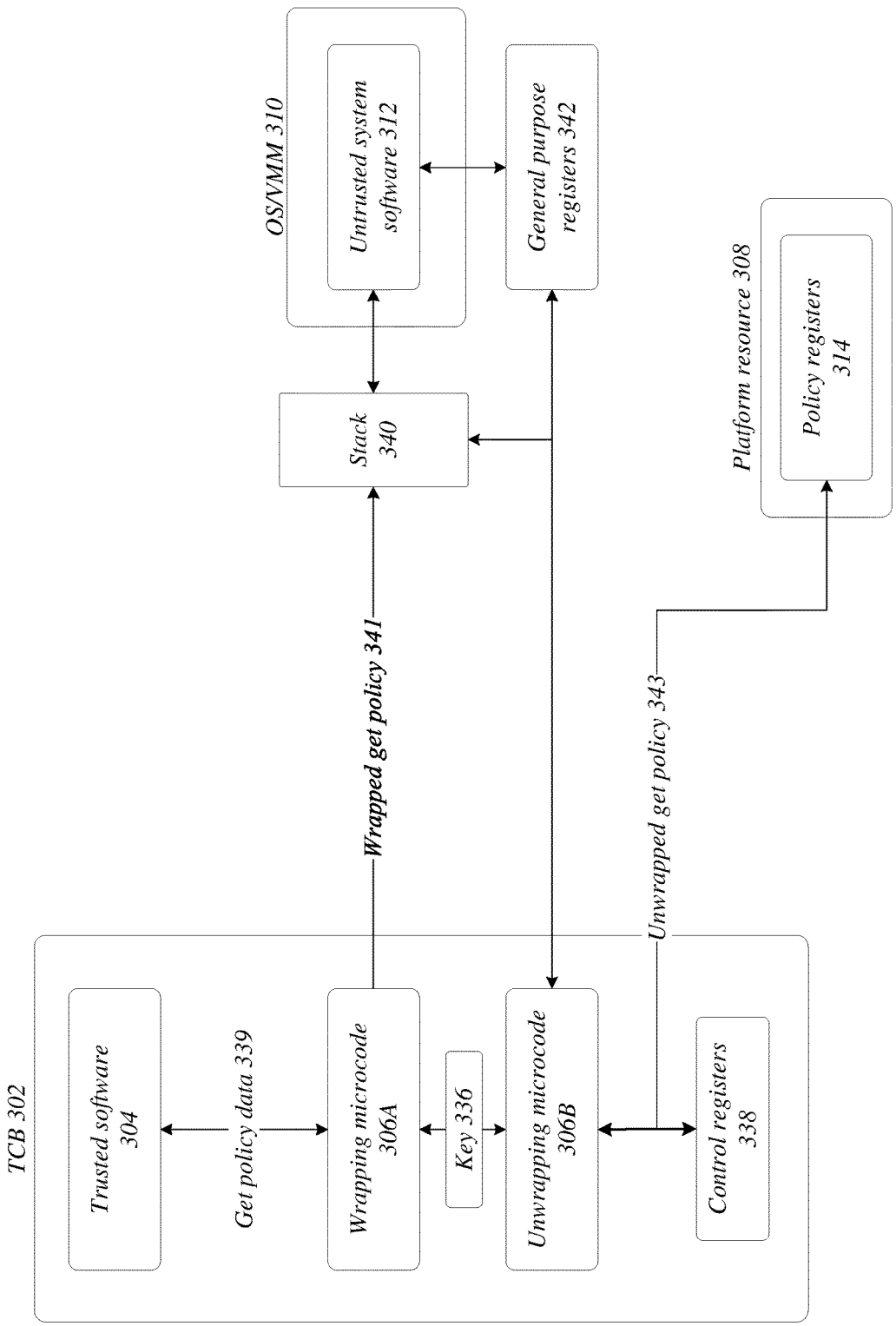
Figure 3C:
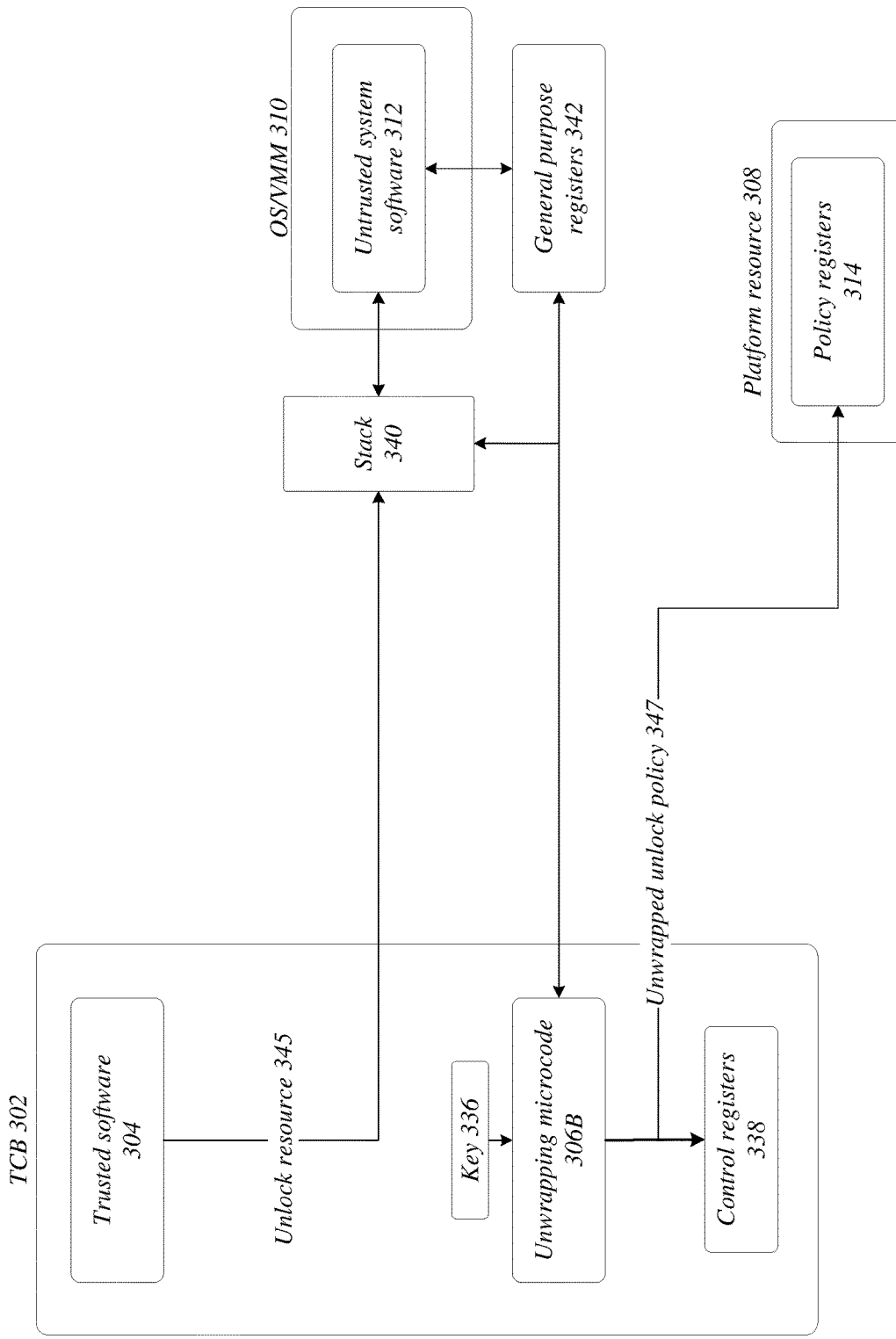

FIGS. 3A-3C illustrate exemplary aspects of controlling a policy for a platform resource 308 in environments 300A, 300B, 300C according to one or more embodiments described herein. In various embodiments, FIG. 3A may illustrate aspects of implementing and locking a policy, FIG. 3B may illustrate aspects of checking a policy, and FIG. 3C may illustrate aspects of unlocking a policy. In one or more embodiments described herein, implementing and locking a policy, checking a policy, and unlocking a policy may be utilized to enable trusted software 304 to enforce a policy in a secure manner. Embodiments are not limited in this context.

Referring to FIG. 3A, in environment 300A, the trusted software 304 may provide the policy and policy data and request locking the policy for platform resource 308 at set policy 334. In various embodiments, this may be achieved with the WRAP_POLICY instruction as implemented by wrapping microcode 306A. In various embodiments, initially, the trusted software 304 utilizes the WRAP_POLICY instruction to cause wrapping microcode 306A to generate a wrapped lock policy 333 and a wrapped unlock policy 335. In some embodiments, the wrapped lock policy 333 and the wrapped unlock policy 335 may be referred to as wrapped blobs. In many embodiments, the wrapped blobs may include one or more policy settings for the platform resource 308 based on the policy data provided by trusted software 304. In various embodiments, the wrapped blobs may be wrapped using a key 336. In various such embodiments, the key 336 may include a microcode-only known key. These wrapped blobs may then be passed to untrusted system software 312 in OS/VMM 310, such as via stack 340.

In one or more embodiments, the UNWRAP_POLICY instruction may take the wrapped lock policy 333 generated by the WRAP_POLICY instruction as an input parameter. In various embodiments, the UNWRAP_POLICY instruction may verify the MAC on the blob and program the appropriate registers to the platform resource as guided by policy settings included in the policy 226 and target data 228 fields of the wrapped blob. In many embodiments, the unwrapping may be done using key 336, which may include a microcode-only known key. In some embodiments, the key 336 may be generated by hardware at reset and used for the entire reset cycle. In addition to providing the programming to the platform resource 308, the UNWRAP_POLICY instruction may allow the untrusted system software 312 to verify the validity of wrapped blobs without doing any programming. In various embodiments, this may be achieved by passing commands and receiving responses from unwrapping microcode 306B via general purpose registers 342. For example, a first general purpose register may take command encoding (e.g., 0: verify and return validity, 1: unwrap and program). Further, a second general purpose register may take the address of the target wrapped blob. The status of instruction execution may be returned in the one of the general purpose registers. For instance, successful verification of the blob using the "verify and return validity" command may return a 0 in the general purpose register to indicate successful verification of the block and a 1 may be returned to indicate a verification failure for the blob. The "verify and return validity" command may be utilized to support a DoS resistant protocol as will be described in more detail below.

In various embodiments, the mechanism described above may be used to program the policy settings provided in a wrapped blob (e.g., wrapped lock policy 333) to policy registers 314. For instance, by using the appropriate command encoding in general purpose registers 342 to cause unwrapping microcode 306B to program policy registers 314 with unwrapped lock policy 337. However, because the policy registers 314 may normally be controlled (read/written) by untrusted system software 312, protections against overwriting the registers after programming of the policy by trusted software 304 may be needed. These protections may be provided by one or more of control registers 338. To provide these protections, lock bits set in control registers 338 may be introduced to policy registers (see e.g., FIGS. 4A and 4B). For instance, a lock-only registers included in control registers 338 may be introduced with one bit associated with each of the policy registers 314. In some instances, this may allow for flexibility in locking for different usages. During the lock policy operation, the microcode 306 B, in addition to writing to the policy registers 314 may also write to the corresponding lock bits in the control register to lock them from further modification (see e.g., FIG. 3A).

In many embodiments, the policy registers 314 may be unlocked and opened for other usages only when the originally locking trusted software requests for unlocking. For instance, as shown in FIG. 3C, trusted software 304 may utilize unlock resource 345 to cause the untrusted system software 312 to provide the appropriate command encoding to general purpose registers 342 to cause unwrapping microcode 306B to clear the lock bit in control register 338 and clear the policy register 314 with unwrapped unlock policy 347. In addition to the lock bits, control registers 338 may include an ownership register. The ownership register may carry the ownership information for the policy registers and whether there is a valid owner for the policies or not. In some embodiments, this may be populated using the owner identifier 230 field of ISA instruction 220. For instance, the lock policy command used in conjunction with the WRAP_POLICY instruction may set the ownership information and the unlock policy command may clear it only if the ownership information provided matches the ownership information that was provided with the lock policy command. In many embodiments this may ensure that only the original entity that locked the policy registers can unlock them later. The lock bits register and ownership register included in the control registers 338 will be described in more detail with respect to FIGS. 4A and 4B.

Referring to FIG. 3B, the trusted software 304 may be able to verify the configuration or policy enforced on the platform resource with get policy data 339. In various embodiments, this may be accomplished using the get policy command in conjunction with the WRAP_POLICY instruction. This command when used with the WRAP_POLICY instruction and executed by untrusted system software 312 using the UNWRAP_POLICY instruction may read the policy and lock registers and return an integrity protected version of the policy registers 314. In various embodiments, the key 336 may be used to generate the integrity value. In some embodiments, this may be done to ensure that the untrusted system software 312 cannot modify the configuration information returned from the get policy command without detection. In many embodiments, software can decide on the frequency of execution of this command. Further software may determine the course of action if suspected malicious activity is identified. For instance, unlocked policy registers could signal that the untrusted software has used the unlocking blob before it should have and trusted software 304 can notify the user to terminate the transaction.

Examples of attacks and mitigations in the context of the secure transaction display context may include one or more of the following. In some embodiments, an untrusted driver in the untrusted system software 312 may unprogram/unlock registers before the secure display session is completed. To mitigate this, the trusted software 304 may verify the display configuration before terminating the secure session to ensure nothing was changed. Additionally, or alternatively, software can implement a policy if a configuration change is detected before session termination. In various embodiments, an untrusted driver may unprogram/unlock a policy register and relock it before secure display session completion by replaying the programming blob (e.g., via unwrapped lock policy 337 and unwrapped unlock policy 347. To mitigate this the WRAP_POLICY and UNWRAP_POLICY instructions implement an anti-rollback mechanism for the blobs via microcode maintaining a monotonic counter, such as in part by using counter 232 field of the ISA instruction 220. Accordingly, once a blob is used it cannot be used a second time.

Figure 4A:
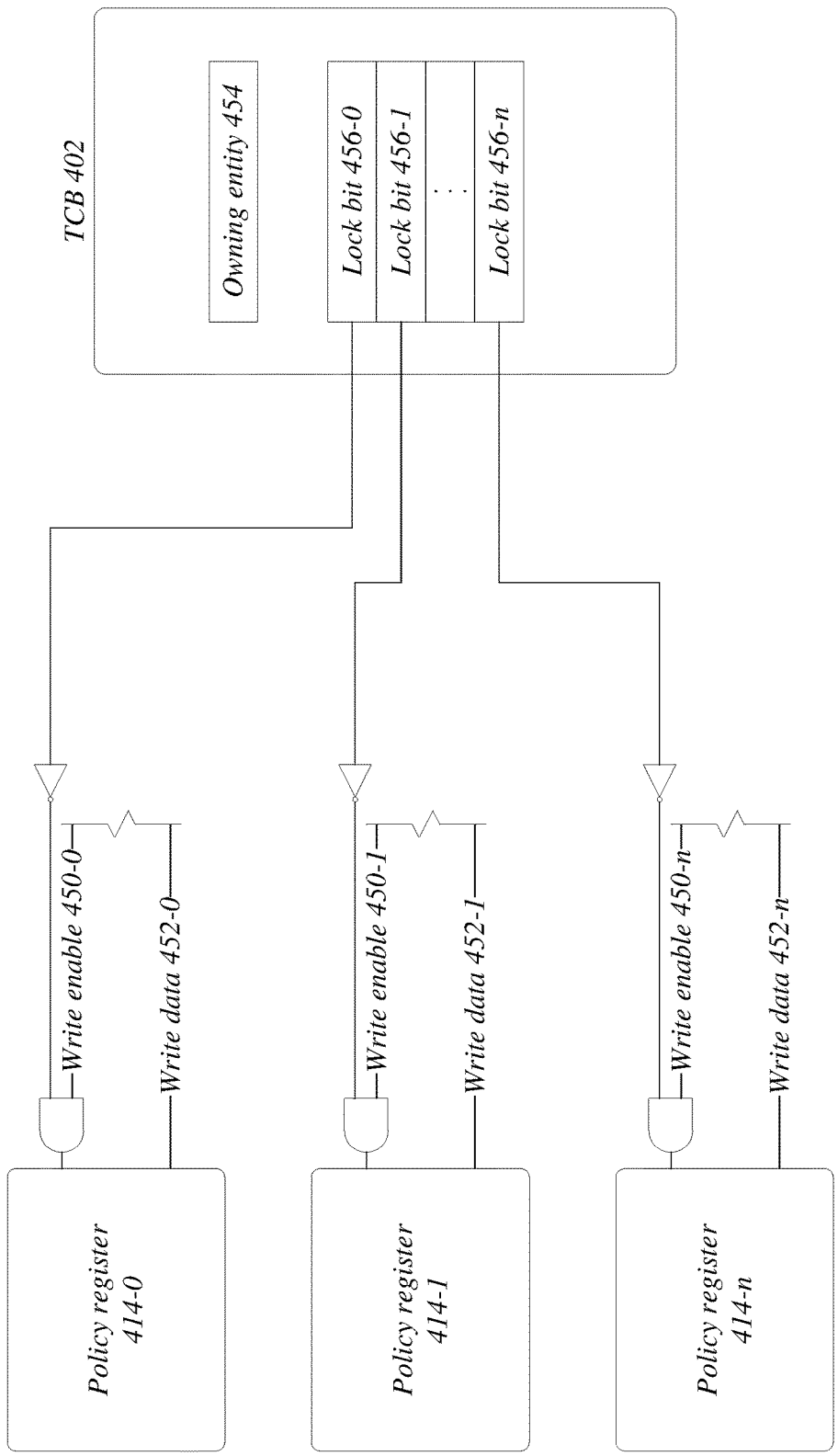
FIGS. 4A and 4B illustrate exemplary aspects of locking policy registers according to one or more embodiments described here.
Figure 4B:
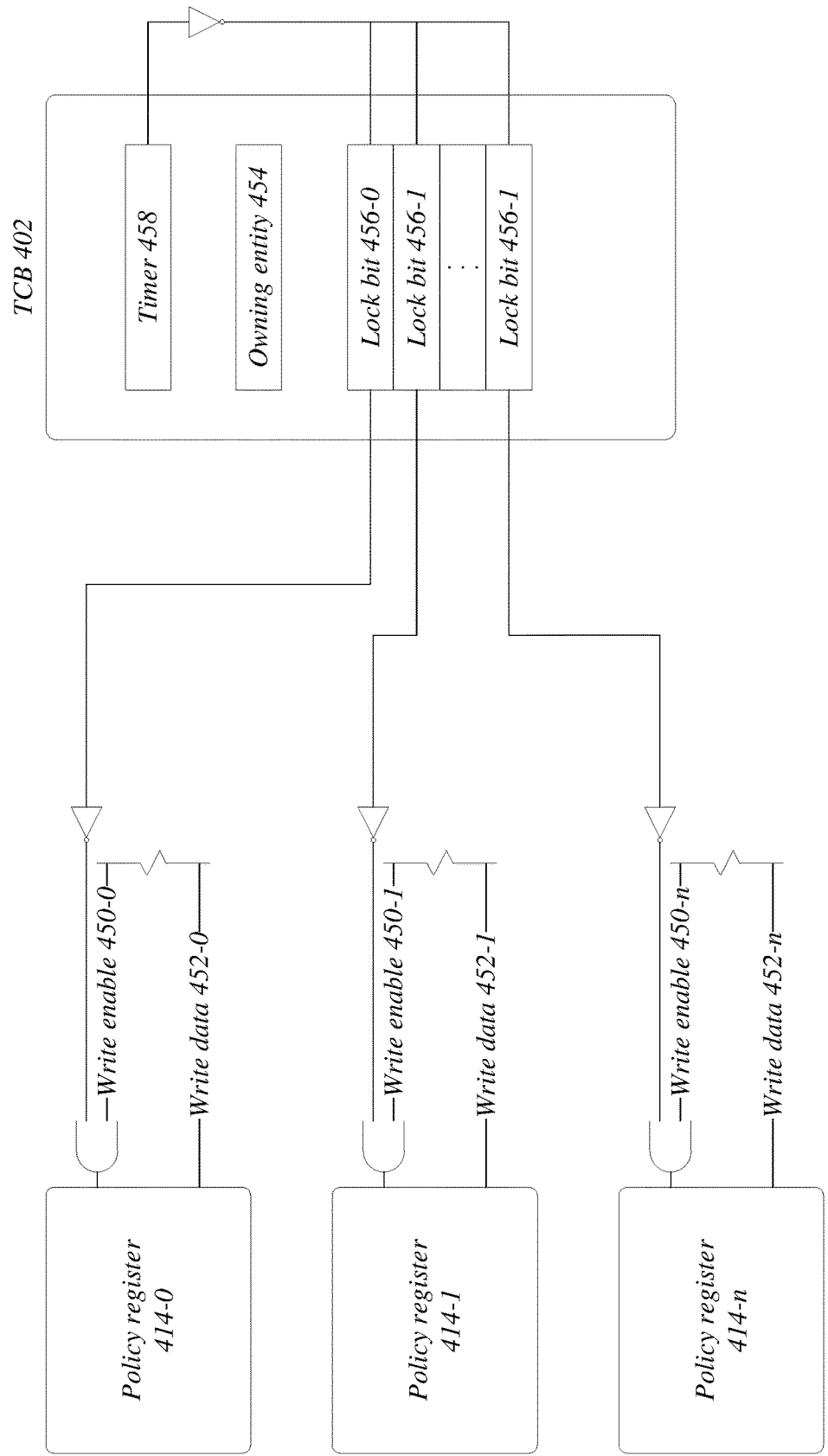

FIGS. 4A and 4B illustrate exemplary aspects of locking policy registers 414 in environments 400A, 400B according to one or more embodiments described herein. In various embodiments, FIGS. 4A and 4B may illustrate hardware changes utilized to implement one or more techniques, mechanisms, or components described herein. In one or more embodiments, the negation of lock bits 456 may be ANDed with corresponding write enables 450 to allow a write to a policy register 414 only when the corresponding lock bit is unset. Accordingly, once a policy is programmed by trusted software, any writes by untrusted software may be dropped because the lock bit is set for the corresponding policy registers. Embodiments are not limited in this context.

In various embodiments, in addition to the lock bits, an ownership register may be used that includes an owning entity 454. In some embodiments, the ownership register may carry the ownership information for the policy registers and whether there is a valid owner for the policies or not. In some embodiments, this may be populated using the owner identifier 230 field of ISA instruction 220. For instance, the lock policy command used in conjunction with the WRAP_POLICY instruction may set the ownership information and the unlock policy command may clear it only if the ownership information provided matches the ownership information that was provided with the lock policy command. In many embodiments this may ensure that only the original entity that locked the policy registers can unlock them later.

Referring to FIG. 4B, in some embodiments, a timer 458 may be used to provide a defined period where the resource is locked. In some such embodiments, at the end of the defined period the lock bits 456 may be reset. For instance, the display engine, or target platform resource, may implement a counter to unlock the policy registers after the specified timer expires. In one or more embodiments, a timer value specification may be provided in the programming request (e.g., lock policy command with WRAP_POLICY instruction). For example, the policy 226 or target data 228 fields on ISA instruction 220 may be updated to carry an integrity protected lock timer value. In such examples, the untrusted system software may inspect the timer value but not modify it without detection.

In various embodiments, specifying a timer value in target data 228 may allow the trusted application to integrity protect the value, but also may allow the untrusted system software to inspect it before allowing programming of the policy registers. In some embodiments, the use of the timer may remove the need for the trusted software locking the platform resource to no longer need to poll the locking status of policy registers (e.g., via get policy command), as untrusted software would not be able to unlock the policy registers before the specified counter expires. In several embodiments, the timer mechanism may require hardware to implement a watchdog timer armed by the lock programming attempt (e.g., lock policy command). In several such embodiments, the watchdog timer may count down and auto release the lock on the policy registers 414 once the timer expires.

Figure 5:
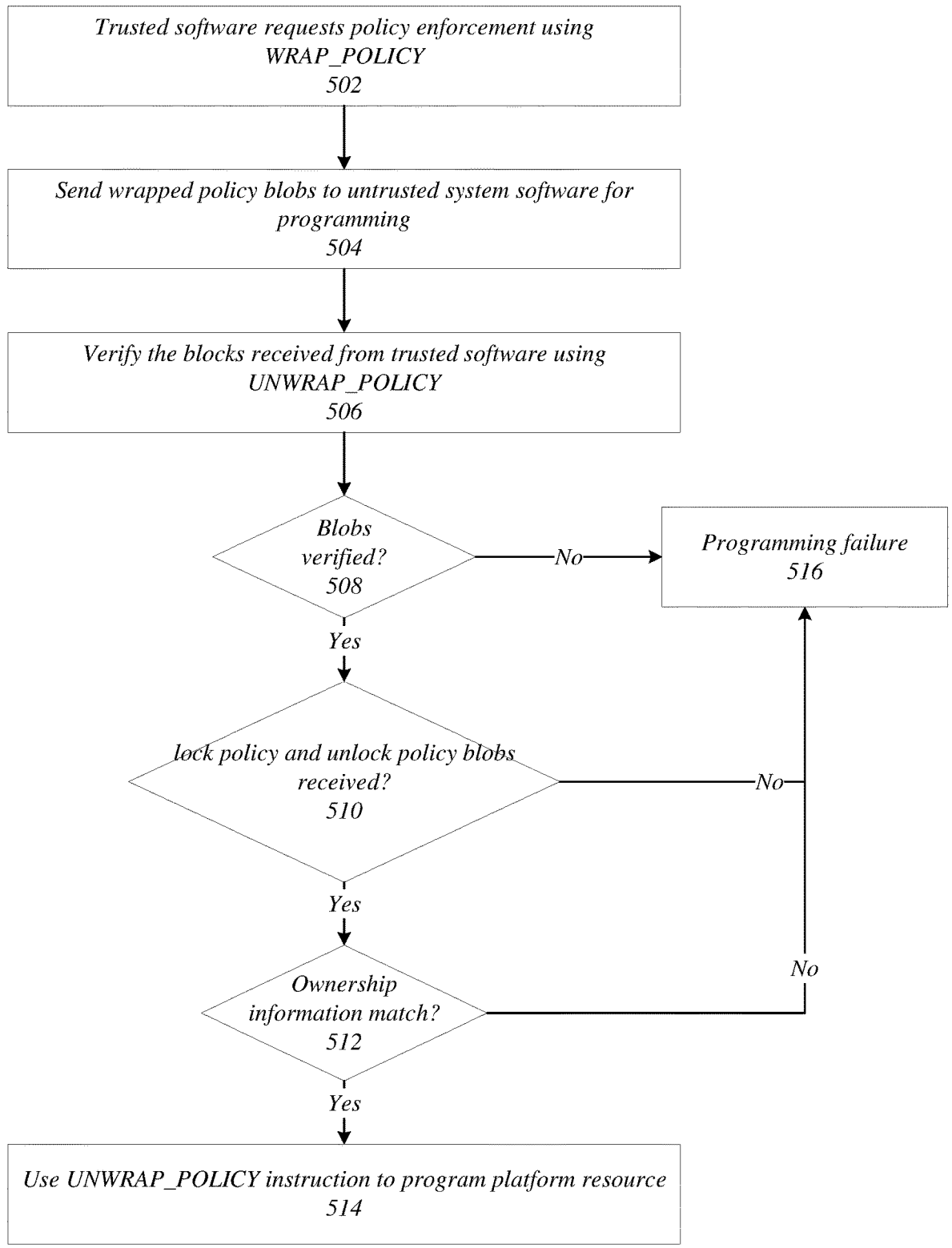
FIG. 5 illustrates an embodiment of a first logic flow according to one or more embodiments described herein.

FIG. 5 illustrates one embodiment of a logic flow 500, which may be representative of operations that may be executed in various embodiments in conjunction with providing secure policy enforcement on platform resources. The logic flow 500 may be representative of some or all of the operations that may be executed by one or more components/devices described herein. The embodiments are not limited in this context.

In many embodiments, the policy enforcement mechanism may give control of a platform resource to ring-3 software. In some embodiments, this may result in DoS either due to malicious ring-3 software or due to buggy ring-3 software crashing after being allocated the platform resource. For instance, an enclave may lock the registers using the lock policy command in conjunction with the WRAP_POLICY instruction but never unlock it, resulting in the registers staying locked indefinitely with no way for system software to unlock them. Accordingly, logic flow 500 provides a protocol to ensure that ring-3 software cannot take over a platform resource indefinitely. The logic flow 500 begin at block 502 with the trusted software needing policy enforcement. This translates into trusted software generating wrapped blobs using the WRAP_policy instruction. The trusted software is expected to generate blobs for both locking and unlocking. At block 504, the trusted software sends both blobs to the system software. Proceeding to block 506, the system software as a first step verifies the validity of the blobs using the UNWRAP_POLICY instruction with the "verify and return validity" command. If the verification succeeds, at block 508, the logic flow 500 proceeds to block 510.

At block 510, the system software verifies that it has received lock policy and unlock policy blobs for the target platform resource. Next, at block 512, the system software verifies that the received blobs are from the same owner (e.g., using owner identifier 230 in the blobs). In many embodiments, it is important for the system software to ensure that the locking and unlocking blobs are from the same entity as unlocking may only be done by the entity that locked it in the first place. The checks outlined here (e.g., blocks 506, 508, 510, 512) ensure that the system software can unlock the platform resource for other usages even if the trusted software is malicious or buggy and does not willingly release the resource. If any of the checks fail, the system software returns failure and does not program the platform resource at block 516. However, if all the check pass, the system software programs the desired platform resource using the UNWRAP_POLICY instruction at block 514.

FIG. 6 illustrates one embodiment of a logic flow 600, which may be representative of operations that may be executed in various embodiments in conjunction with providing secure policy enforcement on platform resources. The logic flow 600 may be representative of some or all of the operations that may be executed by one or more components/devices described herein. The embodiments are not limited in this context.

In the illustrated embodiments, logic flow 600 may begin at block 602. At block 602 "generate a wrapped lock policy and a wrapped unlock policy with a first instruction set architecture (ISA) instruction implemented by microcode based on policy data provided by trusted software, wherein the wrapped lock policy includes a policy setting for a platform resource based on the policy data" a wrapped lock policy and a wrapped unlock policy may be generated with a first ISA instruction implemented by microcode based on policy data provided by trusted software. For instance, ISA instruction 220 may be used in conjunction with the lock policy command to generate wrapped lock policy 333 and ISA instruction 220 may be used in conjunction with the unlock policy command to generate wrapped unlock policy 335. In various embodiments, the wrapped lock policy may include a policy setting for a platform resource based on policy data provided by trusted software 304.

At block 604 "communicate the wrapped lock policy and the wrapped unlock policy to untrusted system software" the wrapped lock policy and the wrapped unlock policy may be communicated to untrusted system software. For example, wrapped lock policy 333 and wrapped unlock policy 335 may be communicated to untrusted system software 312 via stack 340. Continuing to block 606 "verify the wrapped lock policy and the wrapped unlock policy with a second ISA instruction implemented by microcode" the wrapped lock policy and the wrapped unlock policy may be verified with a second ISA instruction implemented by microcode. For example, the UNWRAP_POLICY instruction may allow untrusted system software 312 to verify the validity of the wrapped lock policy and the wrapped unlock policy. In some embodiments, this may be achieved by using the "verify and return validity" command in conjunction with the UNWRAP_POLICY instruction.

Proceeding to block 608 "determine generation of the wrapped lock policy and the wrapped unlock policy are associated with a common owner identifier" a determination that generation of the wrapped lock policy and the wrapped unlock policy are associated with a common owner identifier may be made. For instance, it may be determined that the owner identifier 230 field of the wrapped lock policy matches the owner identifier 230 field of the wrapped unlock policy. At block 610 "store the policy setting in a policy register to program the platform resource for use by the trusted software with the second ISA instruction based on verification of the wrapped lock policy and the wrapped lock policy and determination the wrapped lock policy and the wrapped lock policy are associated with the common owner identifier" the policy setting may be stored in a policy register to program the platform resource for use by the trusted software with the second ISA instruction based on verification of the wrapped lock policy and the wrapped lock policy and determination the wrapped lock policy and the wrapped lock policy are associated with the common owner identifier. For example, the policy setting may be stored to one or more of policy registers 114 to program one of platform resources 108 for use by the trusted software 104.

FIG. 7 illustrates an embodiment of a storage medium 700. Storage medium 700 may comprise any non-transitory computer-readable storage medium or machine-readable storage medium, such as an optical, magnetic or semiconductor storage medium. In various embodiments, storage medium 700 may comprise an article of manufacture. In some embodiments, storage medium 700 may store computer-executable instructions, such as computer-executable instructions to implement one or more of logic flows or operations described herein, such as with respect to logic flow 600 of FIG. 6. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 8:
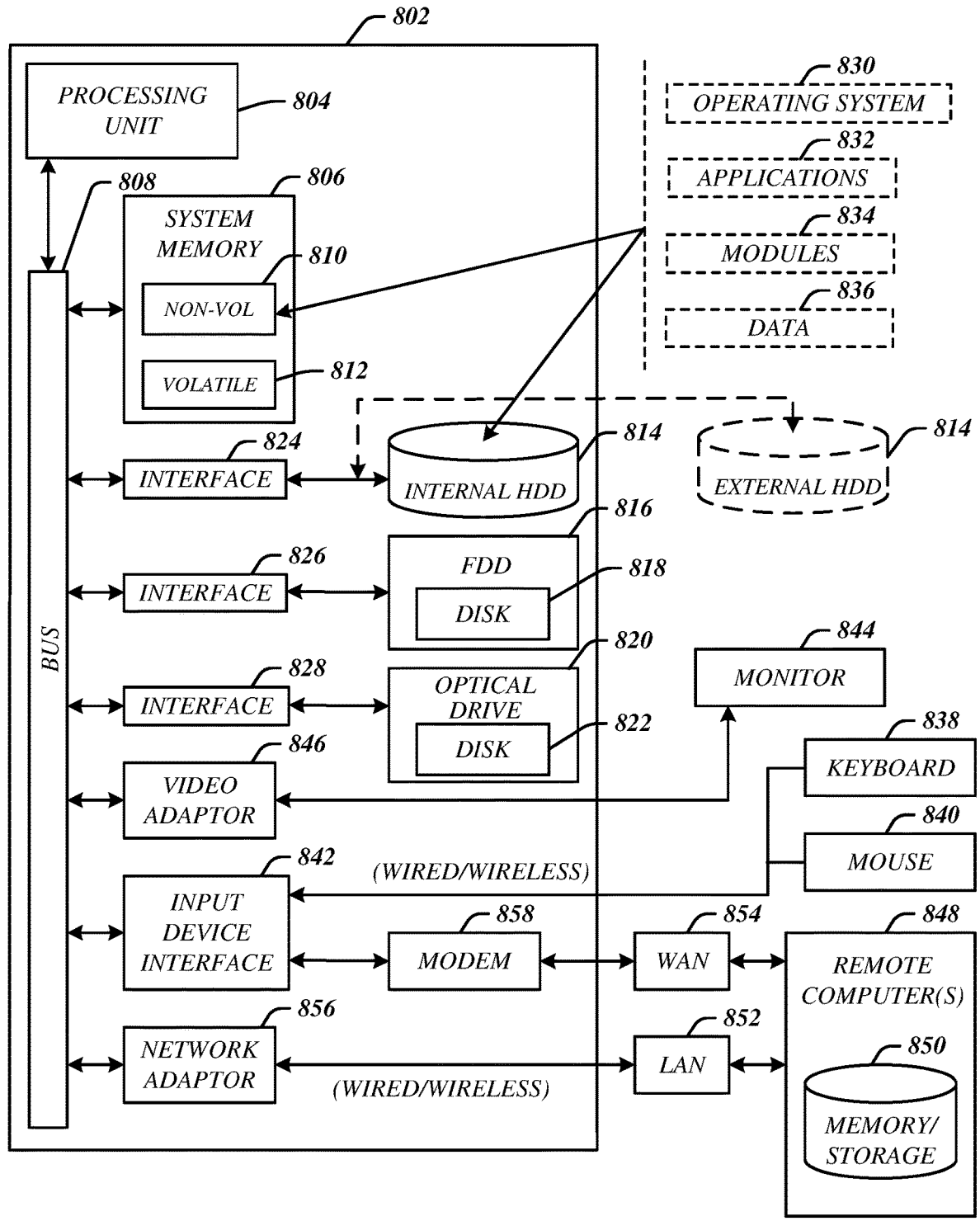
FIG. 8 illustrates an embodiment of a computing architecture according to one or more embodiments described herein.

FIG. 8 illustrates an embodiment of an exemplary computing architecture 800 that may be suitable for implementing various embodiments as previously described. In various embodiments, the computing architecture 800 may comprise or be implemented as part of an electronic device. In some embodiments, the computing architecture 800 may be representative, for example, of a distributed processing system that implements or utilizes one or more components described herein. In some embodiments, computing architecture 800 may be representative, for example, of a compute node in a distributed processing system described herein that implements or utilizes one or more techniques described herein. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 comprises a processing unit 804, a system memory 806 and a system bus 808. The processing unit 804 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 804.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. In some embodiments, system memory 806 may include main memory. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and Institute of Electrical and Electronics Engineers (IEEE) 994 interface technologies. In various embodiments, these types of memory may not be included in main memory or system memory.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include or implement, for example, the various techniques, applications, and/or components described herein.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 804 through an input device interface 842 that is coupled to the system bus 808, but can be connected by other interfaces such as a parallel port, IEEE 994 serial port, a game port, a USB port, an IR interface, and so forth.

A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. In various embodiments, one or more migrations may occur via the networked environment. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 9:
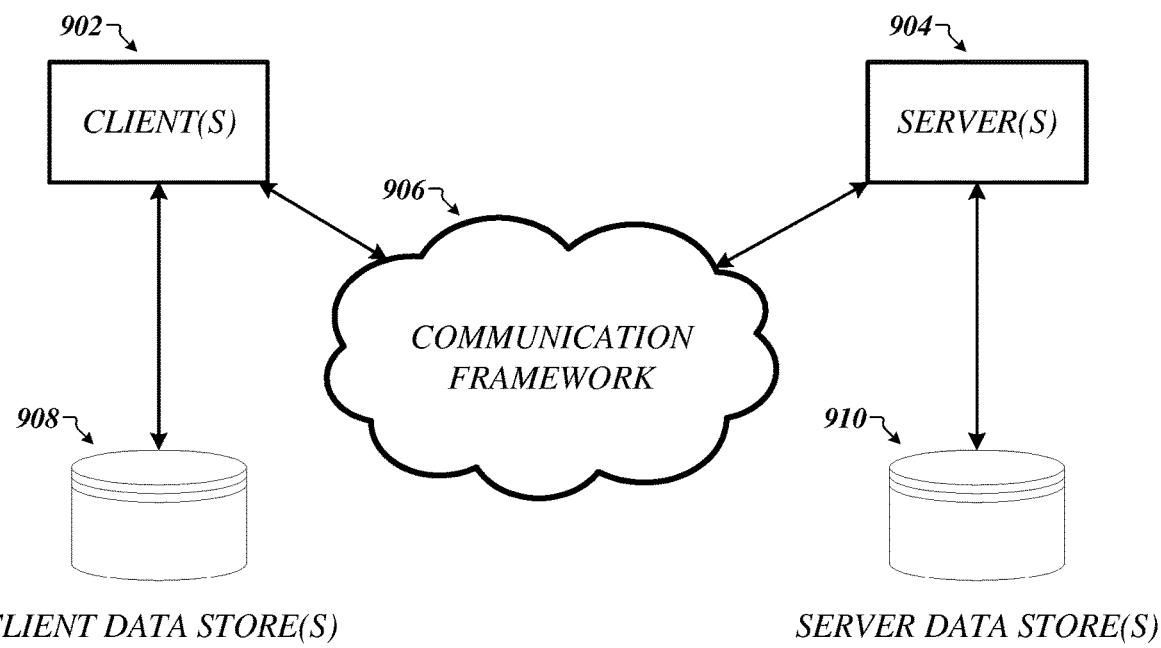
FIG. 9 illustrates an embodiment of a communications architecture according to one or more embodiments described herein.

FIG. 9 illustrates a block diagram of an exemplary communications architecture 900 suitable for implementing various embodiments as previously described, such as virtual machine migration. The communications architecture 900 includes various common communications elements, such as a transmitter, receiver, transceiver, radio, network interface, baseband processor, antenna, amplifiers, filters, power supplies, and so forth. The embodiments, however, are not limited to implementation by the communications architecture 900.

As shown in FIG. 9, the communications architecture 900 comprises includes one or more clients 902 and servers 904. In some embodiments communications architecture may include or implement one or more portions of components, applications, and/or techniques described herein. The clients 902 and the servers 904 are operatively connected to one or more respective client data stores 908 and server data stores 910 that can be employed to store information local to the respective clients 902 and servers 904, such as cookies and/or associated contextual information. In various embodiments, any one of servers 904 may implement one or more of logic flows or operations described herein, and storage medium 700 of FIG. 7 in conjunction with storage of data received from any one of clients 902 on any of server data stores 910. In one or more embodiments, one or more of client data store(s) 908 or server data store(s) 910 may include memory accessible to one or more portions of components, applications, and/or techniques described herein.

The clients 902 and the servers 904 may communicate information between each other using a communication framework 906. The communications framework 906 may implement any well-known communications techniques and protocols. The communications framework 906 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 906 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1900 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 902 and the servers 904. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments, from which numerous permutations and configurations will be apparent.

Example 1 is an apparatus, comprising: a processor; and a memory comprising instructions that when executed by the processor cause the processor to: generate a wrapped lock policy and a wrapped unlock policy with a first instruction set architecture (ISA) instruction implemented by microcode based on policy data provided by trusted software, wherein the wrapped lock policy includes a policy setting for a platform resource based on the policy data; communicate the wrapped lock policy and the wrapped unlock policy to untrusted system software; verify the wrapped lock policy and the wrapped unlock policy with a second ISA instruction implemented by microcode; determine generation of the wrapped lock policy and the wrapped unlock policy are associated with a common owner identifier; and store the policy setting in a policy register to program the platform resource for use by the trusted software with the second ISA instruction based on verification of the wrapped lock policy and the wrapped lock policy and determination the wrapped lock policy and the wrapped lock policy are associated with the common owner identifier.

Example 2 includes the subject matter of Example 1, the memory comprising instructions that when executed by the processor cause the processor to set a lock bit associated with the platform resource based on generation of the wrapped lock policy.

Example 3 includes the subject matter of Example 1, the memory comprising instructions that when executed by the processor cause the processor to verify the wrapped lock policy and the wrapped unlock policy with the second ISA instruction implemented by microcode based on first contents stored in a general purpose register by the untrusted system software.

Example 4 includes the subject matter of Example 3, the memory comprising instructions that when executed by the processor cause the processor to program the platform resource for use by the trusted software according to the policy data with the second ISA instruction based on second contents stored in the general purpose register by the untrusted system software.

Example 5 includes the subject matter of Example 1, the memory comprising instructions that when executed by the processor cause the processor to set one or more registers based on the policy data to program the platform resource for use by the trusted software.

Example 6 includes the subject matter of Example 1, the first ISA instruction include a structure that comprises a target field, a command field, a policy field, and an owner identifier field.

Example 7 includes the subject matter of Example 6, the memory comprising instructions that when executed by the processor cause the processor to generate the wrapped lock policy with the first ISA instruction when the command field includes a lock policy command.

Example 8 includes the subject matter of Example 6, the memory comprising instructions that when executed by the processor cause the processor to generate the wrapped unlock policy with the first ISA instruction when the command field includes an unlock policy command.

Example 9 includes the subject matter of Example 6, the memory comprising instructions that when executed by the processor cause the processor to determine generation of the wrapped lock policy and the wrapped unlock policy are associated with the common owner identifier based on comparison of the owner identifier field of the wrapped lock policy and the owner identifier field of the wrapped unlock policy.

Example 10 includes the subject matter of Example 6, the memory comprising instructions that when executed by the processor cause the processor to check a state of the policy register with the first ISA instruction when the command field includes a get policy command.

Example 11 includes the subject matter of Example 1, the memory comprising instructions that when executed by the processor cause the processor to communicate the wrapped lock policy and the wrapped unlock policy to system software via a stack.

Example 12 includes the subject matter of Example 1, the memory comprising instructions that when executed by the processor cause the processor to: confirm receipt of the wrapped lock policy and the wrapped unlock policy by the untrusted system software; and store the policy setting in the policy register to program the platform resource for use by the trusted software with the second ISA instruction based on confirmation of receipt of the wrapped lock policy and the wrapped lock policy, verification of the wrapped lock policy and the wrapped lock policy, and determination the wrapped lock policy and the wrapped lock policy are associated with the common owner identifier.

Example 13 includes the subject matter of Example 1, the common owner identifier comprising an identifier of the trusted software that is inaccessible to the untrusted system software.

Example 14 includes the subject matter of Example 1, the first ISA instruction to utilize a key inaccessible by the untrusted system software to generate the wrapped lock policy and the wrapped unlock policy.

Example 15 includes the subject matter of Example 14, the first ISA instruction to access the wrapped lock policy and the wrapped unlock policy with the key inaccessible by the untrusted system software.

Example 16 includes the subject matter of Example 1, the first ISA instruction comprising a WRAP_POLICY instruction and the second ISA instruction comprising an UNWRAP_POLICY instruction.

Example 17 includes the subject matter of Example 1, wherein the first ISA instruction is called by the trusted software and the second ISA instruction is called by the untrusted system software.

Example 18 includes the subject matter of Example 1, wherein the wrapped lock policy and the wrapped unlock policy each include a counter value to prevent replay by the untrusted system software.

Example 19 includes the subject matter of Example 1, wherein the wrapped lock policy and the wrapped unlock policy each include a message authentication code (MAC) to prevent modification by the untrusted system software.

Example 20 includes the subject matter of Example 1, wherein the untrusted system software comprises an operating system or a virtual machine monitor.

Example 21 is at least one non-transitory computer-readable medium comprising a set of instructions that, in response to being executed by a processor circuit, cause the processor circuit to: generate a wrapped lock policy and a wrapped unlock policy with a first instruction set architecture (ISA) instruction implemented by microcode based on policy data provided by trusted software, wherein the wrapped lock policy includes a policy setting for a platform resource based on the policy data; communicate the wrapped lock policy and the wrapped unlock policy to untrusted system software; verify the wrapped lock policy and the wrapped unlock policy with a second ISA instruction implemented by microcode; determine generation of the wrapped lock policy and the wrapped unlock policy are associated with a common owner identifier; and store the policy setting in a policy register to program the platform resource for use by the trusted software with the second ISA instruction based on verification of the wrapped lock policy and the wrapped lock policy and determination the wrapped lock policy and the wrapped lock policy are associated with the common owner identifier.

Example 22 includes the subject matter of Example 21, comprising instructions that, in response to being executed by the processor circuit, cause the processor circuit to set a lock bit associated with the platform resource based on generation of the wrapped lock policy.

Example 23 includes the subject matter of Example 21, comprising instructions that, in response to being executed by the processor circuit, cause the processor circuit to verify the wrapped lock policy and the wrapped unlock policy with the second ISA instruction implemented by microcode based on first contents stored in a general purpose register by the untrusted system software.

Example 24 includes the subject matter of Example 23, comprising instructions that, in response to being executed by the processor circuit, cause the processor circuit to program the platform resource for use by the trusted software according to the policy data with the second ISA instruction based on second contents stored in the general purpose register by the untrusted system software.

Example 25 includes the subject matter of Example 21, comprising instructions that, in response to being executed by the processor circuit, cause the processor circuit to set one or more registers based on the policy data to program the platform resource for use by the trusted software.

Example 26 includes the subject matter of Example 21, the first ISA instruction include a structure that comprises a target field, a command field, a policy field, and an owner identifier field.

Example 27 includes the subject matter of Example 26, comprising instructions that, in response to being executed by the processor circuit, cause the processor circuit to generate the wrapped lock policy with the first ISA instruction when the command field includes a lock policy command.

Example 28 includes the subject matter of Example 26, comprising instructions that, in response to being executed by the processor circuit, cause the processor circuit to generate the wrapped unlock policy with the first ISA instruction when the command field includes an unlock policy command.

Example 29 includes the subject matter of Example 26, comprising instructions that, in response to being executed by the processor circuit, cause the processor circuit to determine generation of the wrapped lock policy and the wrapped unlock policy are associated with the common owner identifier based on comparison of the owner identifier field of the wrapped lock policy and the owner identifier field of the wrapped unlock policy.

Example 30 includes the subject matter of Example 26, comprising instructions that, in response to being executed by the processor circuit, cause the processor circuit to check a state of the policy register with the first ISA instruction when the command field includes a get policy command.

Example 31 includes the subject matter of Example 21, comprising instructions that, in response to being executed by the processor circuit, cause the processor circuit to communicate the wrapped lock policy and the wrapped unlock policy to system software via a stack.

Example 32 includes the subject matter of Example 21, comprising instructions that, in response to being executed by the processor circuit, cause the processor circuit to: confirm receipt of the wrapped lock policy and the wrapped unlock policy by the untrusted system software; and store the policy setting in the policy register to program the platform resource for use by the trusted software with the second ISA instruction based on confirmation of receipt of the wrapped lock policy and the wrapped lock policy, verification of the wrapped lock policy and the wrapped lock policy, and determination the wrapped lock policy and the wrapped lock policy are associated with the common owner identifier.

Example 33 includes the subject matter of Example 21, the common owner identifier comprising an identifier of the trusted software that is inaccessible to the untrusted system software.

Example 34 includes the subject matter of Example 21, the first ISA instruction to utilize a key inaccessible by the untrusted system software to generate the wrapped lock policy and the wrapped unlock policy.

Example 35 includes the subject matter of Example 34, the first ISA instruction to access the wrapped lock policy and the wrapped unlock policy with the key inaccessible by the untrusted system software.

Example 36 includes the subject matter of Example 21, the first ISA instruction comprising a WRAP_POLICY instruction and the second ISA instruction comprising an UNWRAP_POLICY instruction.

Example 37 includes the subject matter of Example 21, wherein the first ISA instruction is called by the trusted software and the second ISA instruction is called by the untrusted system software.

Example 38 includes the subject matter of Example 21, wherein the wrapped lock policy and the wrapped unlock policy each include a counter value to prevent replay by the untrusted system software.

Example 39 includes the subject matter of Example 21, wherein the wrapped lock policy and the wrapped unlock policy each include a message authentication code (MAC) to prevent modification by the untrusted system software.

Example 40 includes the subject matter of Example 21, wherein the untrusted system software comprises an operating system or a virtual machine monitor.

Example 41 is a computer-implemented method, comprising: generating a wrapped lock policy and a wrapped unlock policy with a first instruction set architecture (ISA) instruction implemented by microcode based on policy data provided by trusted software, wherein the wrapped lock policy includes a policy setting for a platform resource based on the policy data; communicating the wrapped lock policy and the wrapped unlock policy to untrusted system software; verifying the wrapped lock policy and the wrapped unlock policy with a second ISA instruction implemented by microcode; determining generation of the wrapped lock policy and the wrapped unlock policy are associated with a common owner identifier; and storing the policy setting in a policy register to program the platform resource for use by the trusted software with the second ISA instruction based on verification of the wrapped lock policy and the wrapped lock policy and determination the wrapped lock policy and the wrapped lock policy are associated with the common owner identifier.

Example 42 includes the subject matter of Example 41, comprising setting a lock bit associated with the platform resource based on generation of the wrapped lock policy.

Example 43 includes the subject matter of Example 41, comprising verifying the wrapped lock policy and the wrapped unlock policy with the second ISA instruction implemented by microcode based on first contents stored in a general purpose register by the untrusted system software.

Example 44 includes the subject matter of Example 43, comprising programming the platform resource for use by the trusted software according to the policy data with the second ISA instruction based on second contents stored in the general purpose register by the untrusted system software.

Example 45 includes the subject matter of Example 41, comprising setting one or more registers based on the policy data to program the platform resource for use by the trusted software.

Example 46 includes the subject matter of Example 41, the first ISA instruction include a structure that comprises a target field, a command field, a policy field, and an owner identifier field.

Example 47 includes the subject matter of Example 46, comprising generating the wrapped lock policy with the first ISA instruction when the command field includes a lock policy command.

Example 48 includes the subject matter of Example 46, comprising generating the wrapped unlock policy with the first ISA instruction when the command field includes an unlock policy command.

Example 49 includes the subject matter of Example 46, comprising determining generation of the wrapped lock policy and the wrapped unlock policy are associated with the common owner identifier based on comparison of the owner identifier field of the wrapped lock policy and the owner identifier field of the wrapped unlock policy.

Example 50 includes the subject matter of Example 46, comprising checking a state of the policy register with the first ISA instruction when the command field includes a get policy command.

Example 51 includes the subject matter of Example 41, comprising communicating the wrapped lock policy and the wrapped unlock policy to system software via a stack.

Example 52 includes the subject matter of Example 41, comprising: confirming receipt of the wrapped lock policy and the wrapped unlock policy by the untrusted system software; and storing the policy setting in the policy register to program the platform resource for use by the trusted software with the second ISA instruction based on confirmation of receipt of the wrapped lock policy and the wrapped lock policy, verification of the wrapped lock policy and the wrapped lock policy, and determination the wrapped lock policy and the wrapped lock policy are associated with the common owner identifier.

Example 53 includes the subject matter of Example 41, the common owner identifier comprising an identifier of the trusted software that is inaccessible to the untrusted system software.

Example 54 includes the subject matter of Example 41, the first ISA instruction to utilize a key inaccessible by the untrusted system software to generate the wrapped lock policy and the wrapped unlock policy.

Example 55 includes the subject matter of Example 54, the first ISA instruction to access the wrapped lock policy and the wrapped unlock policy with the key inaccessible by the untrusted system software.

Example 56 includes the subject matter of Example 41, the first ISA instruction comprising a WRAP_POLICY instruction and the second ISA instruction comprising an UNWRAP_POLICY instruction.

Example 57 includes the subject matter of Example 41, wherein the first ISA instruction is called by the trusted software and the second ISA instruction is called by the untrusted system software.

Example 58 includes the subject matter of Example 41, wherein the wrapped lock policy and the wrapped unlock policy each include a counter value to prevent replay by the untrusted system software.

Example 59 includes the subject matter of Example 41, wherein the wrapped lock policy and the wrapped unlock policy each include a message authentication code (MAC) to prevent modification by the untrusted system software.

Example 60 includes the subject matter of Example 41, wherein the untrusted system software comprises an operating system or a virtual machine monitor.

Example 61 is an apparatus, comprising: means for generating a wrapped lock policy and a wrapped unlock policy with a first instruction set architecture (ISA) instruction implemented by microcode based on policy data provided by trusted software, wherein the wrapped lock policy includes a policy setting for a platform resource based on the policy data; means for communicating the wrapped lock policy and the wrapped unlock policy to untrusted system software; means for verifying the wrapped lock policy and the wrapped unlock policy with a second ISA instruction implemented by microcode; means for determining generation of the wrapped lock policy and the wrapped unlock policy are associated with a common owner identifier; and means for storing the policy setting in a policy register to program the platform resource for use by the trusted software with the second ISA instruction based on verification of the wrapped lock policy and the wrapped lock policy and determination the wrapped lock policy and the wrapped lock policy are associated with the common owner identifier.

Example 62 includes the subject matter of Example 61, comprising means for setting a lock bit associated with the platform resource based on generation of the wrapped lock policy.

Example 63 includes the subject matter of Example 61, comprising means for verifying the wrapped lock policy and the wrapped unlock policy with the second ISA instruction implemented by microcode based on first contents stored in a general purpose register by the untrusted system software.

Example 64 includes the subject matter of Example 63, comprising means for programming the platform resource for use by the trusted software according to the policy data with the second ISA instruction based on second contents stored in the general purpose register by the untrusted system software.

Example 65 includes the subject matter of Example 61, comprising means for setting one or more registers based on the policy data to program the platform resource for use by the trusted software.

Example 66 includes the subject matter of Example 61, the first ISA instruction include a structure that comprises a target field, a command field, a policy field, and an owner identifier field.

Example 67 includes the subject matter of Example 66, comprising means for generating the wrapped lock policy with the first ISA instruction when the command field includes a lock policy command.

Example 68 includes the subject matter of Example 66, comprising means for generating the wrapped unlock policy with the first ISA instruction when the command field includes an unlock policy command.

Example 69 includes the subject matter of Example 66, comprising means for determining generation of the wrapped lock policy and the wrapped unlock policy are associated with the common owner identifier based on comparison of the owner identifier field of the wrapped lock policy and the owner identifier field of the wrapped unlock policy.

Example 70 includes the subject matter of Example 66, comprising means for checking a state of the policy register with the first ISA instruction when the command field includes a get policy command.

Example 71 includes the subject matter of Example 61, comprising means for communicating the wrapped lock policy and the wrapped unlock policy to system software via a stack.

Example 72 includes the subject matter of Example 61, comprising: means for confirming receipt of the wrapped lock policy and the wrapped unlock policy by the untrusted system software; and means for storing the policy setting in the policy register to program the platform resource for use by the trusted software with the second ISA instruction based on confirmation of receipt of the wrapped lock policy and the wrapped lock policy, verification of the wrapped lock policy and the wrapped lock policy, and determination the wrapped lock policy and the wrapped lock policy are associated with the common owner identifier.

Example 73 includes the subject matter of Example 61, the common owner identifier comprising an identifier of the trusted software that is inaccessible to the untrusted system software.

Example 74 includes the subject matter of Example 61, the first ISA instruction to utilize a key inaccessible by the untrusted system software to generate the wrapped lock policy and the wrapped unlock policy.

Example 75 includes the subject matter of Example 74, the first ISA instruction to access the wrapped lock policy and the wrapped unlock policy with the key inaccessible by the untrusted system software.

Example 76 includes the subject matter of Example 61, the first ISA instruction comprising a WRAP_POLICY instruction and the second ISA instruction comprising an UNWRAP_POLICY instruction.

Example 77 includes the subject matter of Example 61, wherein the first ISA instruction is called by the trusted software and the second ISA instruction is called by the untrusted system software.

Example 78 includes the subject matter of Example 61, wherein the wrapped lock policy and the wrapped unlock policy each include a counter value to prevent replay by the untrusted system software.

Example 79 includes the subject matter of Example 61, wherein the wrapped lock policy and the wrapped unlock policy each include a message authentication code (MAC) to prevent modification by the untrusted system software.

Example 80 includes the subject matter of Example 61, wherein the untrusted system software comprises an operating system or a virtual machine monitor.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

The invention claimed is:

1. An apparatus, the apparatus comprising:
   a processor; and
   a memory comprising instructions that when executed by the processor cause the processor to:
   generate a wrapped lock policy and a wrapped unlock policy with a first instruction set architecture (ISA) instruction implemented by microcode based on policy data provided by trusted software, wherein the wrapped lock policy includes a policy setting for a platform resource based on the policy data;
   communicate the wrapped lock policy and the wrapped unlock policy to untrusted system software;
   verify the wrapped lock policy and the wrapped unlock policy with a second ISA instruction implemented by microcode;
   determine generation of the wrapped lock policy and the wrapped unlock policy are associated with a common owner identifier; and
   store the policy setting in a policy register to program the platform resource for use by the trusted software with the second ISA instruction based on verification of the wrapped lock policy and the wrapped unlock policy and determination the wrapped lock policy and the wrapped unlock policy are associated with the common owner identifier.

2. The apparatus of claim 1, the memory comprising instructions that when executed by the processor cause the processor to set a lock bit associated with the platform resource based on generation of the wrapped lock policy.

3. The apparatus of claim 1, the memory comprising instructions that when executed by the processor cause the processor to verify the wrapped lock policy and the wrapped unlock policy with the second ISA instruction implemented by microcode based on first contents stored in a general purpose register by the untrusted system software.

4. The apparatus of claim 3, the memory comprising instructions that when executed by the processor cause the processor to program the platform resource for use by the trusted software according to the policy data with the second ISA instruction based on second contents stored in the general purpose register by the untrusted system software.

5. The apparatus of claim 1, the first ISA instruction include a structure that comprises a target field, a command field, a policy field, and an owner identifier field.

6. The apparatus of claim 5, the memory comprising instructions that when executed by the processor cause the processor to generate the wrapped lock policy with the first ISA instruction when the command field includes a lock policy command.

7. The apparatus of claim 5, the memory comprising instructions that when executed by the processor cause the processor to generate the wrapped unlock policy with the first ISA instruction when the command field includes an unlock policy command.

8. The apparatus of claim 5, the memory comprising instructions that when executed by the processor cause the processor to determine generation of the wrapped lock policy and the wrapped unlock policy are associated with the common owner identifier based on comparison of the owner identifier field of the wrapped lock policy and the owner identifier field of the wrapped unlock policy.

9. The apparatus of claim 5, the memory comprising instructions that when executed by the processor cause the processor to check a state of the policy register with the first ISA instruction when the command field includes a get policy command.

10. At least one non-transitory computer-readable medium comprising a set of instructions that, in response to being executed by a processor circuit, cause the processor circuit to:
generate a wrapped lock policy and a wrapped unlock policy with a first instruction set architecture (ISA) instruction implemented by microcode based on policy data provided by trusted software, wherein the wrapped lock policy includes a policy setting for a platform resource based on the policy data;
communicate the wrapped lock policy and the wrapped unlock policy to untrusted system software;
verify the wrapped lock policy and the wrapped unlock policy with a second ISA instruction implemented by microcode;
determine generation of the wrapped lock policy and the wrapped unlock policy are associated with a common owner identifier; and
store the policy setting in a policy register to program the platform resource for use by the trusted software with the second ISA instruction based on verification of the wrapped lock policy and the wrapped unlock policy and determination the wrapped lock policy and the wrapped unlock policy are associated with the common owner identifier.

11. The at least one non-transitory computer-readable medium of claim 10, the first ISA instruction comprising a WRAP_POLICY instruction and the second ISA instruction comprising an UNWRAP_POLICY instruction.

12. The at least one non-transitory computer-readable medium of claim 10, wherein the first ISA instruction is called by the trusted software and the second ISA instruction is called by the untrusted system software.

13. The at least one non-transitory computer-readable medium of claim 10, wherein the wrapped lock policy and the wrapped unlock policy each include a counter value to prevent replay by the untrusted system software.

14. The at least one non-transitory computer-readable medium of claim 10, wherein the wrapped lock policy and the wrapped unlock policy each include a message authentication code (MAC) to prevent modification by the untrusted system software.

15. The at least one non-transitory computer-readable medium of claim 10, wherein the untrusted system software comprises an operating system or a virtual machine monitor.

16. A computer-implemented method, comprising:
generating a wrapped lock policy and a wrapped unlock policy with a first instruction set architecture (ISA) instruction implemented by microcode based on policy data provided by trusted software, wherein the wrapped lock policy includes a policy setting for a platform resource based on the policy data;
communicating the wrapped lock policy and the wrapped unlock policy to untrusted system software;
verifying the wrapped lock policy and the wrapped unlock policy with a second ISA instruction implemented by microcode;
determining generation of the wrapped lock policy and the wrapped unlock policy are associated with a common owner identifier; and
storing the policy setting in a policy register to program the platform resource for use by the trusted software with the second ISA instruction based on verification of the wrapped lock policy and the wrapped unlock policy and determination the wrapped lock policy and the wrapped unlock policy are associated with the common owner identifier.

17. The computer-implemented method of claim 16, comprising communicating the wrapped lock policy and the wrapped unlock policy to system software via a stack.

18. The computer-implemented method of claim 16, comprising:
confirming receipt of the wrapped lock policy and the wrapped unlock policy by the untrusted system software; and
storing the policy setting in the policy register to program the platform resource for use by the trusted software with the second ISA instruction based on confirmation of receipt of the wrapped lock policy and the wrapped lock policy, verification of the wrapped lock policy and the wrapped unlock policy, and determination the wrapped lock policy and the wrapped unlock policy are associated with the common owner identifier.

19. The computer-implemented method of claim 16, the common owner identifier comprising an identifier of the trusted software that is inaccessible to the untrusted system software.

20. The computer-implemented method of claim 16, the first ISA instruction to utilize a key inaccessible by the untrusted system software to generate the wrapped lock policy and the wrapped unlock policy.

21. The computer-implemented method of claim 20, the first ISA instruction to access the wrapped lock policy and the wrapped unlock policy with the key inaccessible by the untrusted system software.

22. The computer-implemented method of claim 16, the first ISA instruction comprising a WRAP_POLICY instruction and the second ISA instruction comprising an UNWRAP_POLICY instruction.

23. The computer-implemented method of claim 16, wherein the first ISA instruction is called by the trusted software and the second ISA instruction is called by the untrusted system software.

24. The computer-implemented method of claim 16, wherein the wrapped lock policy and the wrapped unlock policy each include a counter value to prevent replay by the untrusted system software.

25. The computer-implemented method of claim 16, wherein the wrapped lock policy and the wrapped unlock policy each include a message authentication code (MAC) to prevent modification by the untrusted system software.

\* \* \* \* \*